United States Patent [19]
Gerber

[11] 3,763,049
[45] Oct. 2, 1973

[54] PROCESS FOR THE CONTINUOUS RECOVERY OF MATERIALS FROM SEA WATER

[76] Inventor: Arthur M. Gerber, 508 Beacon St., Boston, Mass. 02115

[22] Filed: July 16, 1971

[21] Appl. No.: 163,362

Related U.S. Application Data

[63] Continuation-in-part of Ser. No. 837,938, June 30, 1969, abandoned.

[52] U.S. Cl................ 252/301.1 R, 423/7, 423/22, 423/24, 423/63, 423/181, 423/21
[51] Int. Cl............................................... C09h 3/00
[58] Field of Search ....................... 423/6, 7, 20, 22, 423/24, 63, 21, 181; 252/301.1 R; 23/309; 210/38, 40; 75/97

[56] References Cited
UNITED STATES PATENTS
3,155,454 11/1964 Salutsky et al.......................... 423/6

Primary Examiner—Stephen J. Lechert, Jr.
Attorney—Richard P. Crowley et al.

[57] ABSTRACT

An apparatus and process for the recovery of materials from sea water and brine wherein valuable constituents of sea water and brine, such as ionic substances, are recovered by employing an endless belt of a supported activated clay-mineral material characterized by a sheet-silicate structure therein; for example, vermiculite. Such a belt is passed through a series of stations comprising an activating station for the vermiculite, and a contacting station wherein the activated vermiculite absorbs into its laminar-spacing area the material to be recovered from the sea water or brine, and an elution station wherein the material so recovered is eluted from the vermiculite on the endless belt and the process repeated to provide an elution bath of recovered material.

21 Claims, 2 Drawing Figures

PATENTED OCT 2 1973      3,763,049

INVENTOR.
ARTHUR M. GERBER
BY CROWLEY AND STEVENS
*Crowley & Stevens*
ATTORNEYS

PROCESS FOR THE CONTINUOUS RECOVERY OF MATERIALS FROM SEA WATER

REFERENCE TO PRIOR APPLICATION

This application is a continuation-in-part of my U.S. Pat. application Ser. No. 837,938, filed June 30, 1969 (now abandoned).

BACKGROUND OF THE INVENTION

The present invention relates to the recovery of materials dissolved or suspended in natural water. Natural waters, such as oceans, rivers, lakes and streams, are known to contain dissolved and suspended materials. For example, saline waters, such as sea water or water from salty wells, contain at least 33,000 parts per million of dissolved solids.

Some existing processes for the recovery of materials from natural water involve some type of treatment of the water, such as pumping, chemical alteration or processing, solvent extraction (U.S. Pat. Nos. 2,955,932 and 3,374,090), flotation (U.S. Pat. Nos. 3,240,556 and 3,414,511), precipitation (U.S. Pat. Nos. 1,617,353 and 3,065,047) or evaporation. Other existing processes employ organic materials, such as ion-exchange resins (U.S. Pat. Nos. 2,813,838, 2,911,362, 3,006,756 and 3,055,754). Since the concentration of the most valuable components is relatively low, practical recovery has been difficult by employing the known processes.

Accordingly, an object of the present invention is to provide an improved apparatus and process for recovering certain materials, compounds, complexes and ions from natural water, such as sea water, brackish water, and the like, which apparatus and process is simple and economical.

Another object is to provide a process which is capable of recovering boron, lithium, selenium and strontium and other metallic ions.

A further object is to provide a process which is capable of recovering materials which are present only in trace concentration, such as heavy metals and compounds of biological origin or activity.

Other and further objects will be obvious upon an understanding of the illustrative embodiment about to be described, or will be indicated in the appended claims, and various advantages not referred to herein will occur to one skilled in the art upon employment of the invention in practice.

SUMMARY OF THE INVENTION

In accordance with the present invention, the foregoing objects are generally accomplished by exposing a supported activated mica-type substrate, particularly vermiculite, to natural water to extract materials from the water and recovering the materials from the substrate. The basic concept of the present invention is to employ an activated inorganic substrate, such as mica or vermiculite, which is attached to the surface of a member, such as a sheet, and immersing the sheet in natural water to recover materials dissolved or suspended therein.

My apparatus and process provide for the continuous recovery of a wide variety of inorganic and organic materials from water, such as sea water, brackish water, waste salt solutions and the like, which process and apparatus provide for the activating of a clay-mineral substance, particularly an absorptive spongy vermiculite particle supported on a substrate, the contacting of the clay-mineral substance with a solution having the desirable components to be recovered, thereby absorbing the material to be recovered within the particular laminar-spacing structure of the activated clay-mineral material, and thereafter, eluting said recovered material from the laminar spacing of the clay-mineral substance, and repeating the process steps. In particular, my apparatus and process provide a simple and economical technique for recovering valuable heavy metal ions from sea water wherein an endless belt of a supported activated vermiculite is employed. My invention comprises an apparatus for and a process of recovering material from natural water and to the supported activated vermiculite substrate employed in said apparatus and process.

My invention involves the process for recovering materials, particularly ionic substances, dissolved or suspended in sea water, which process comprises: providing a sheet material containing a clay-mineral substance, which substance is characterized by a sheet silicate structure, the sheet silicate separated by cations and defining a spaced laminar area, and further, having cation sites within such spaced laminar area; passing the sheet material into contact with a liquid bath containing a compound to activate a substantial portion, but not all, of the cation sites with hydrogen or ammonium ions, thereby providing an activated clay-mineral substance on the sheet material; removing excess activating compound from said activated sheet material; contacting the activated sheet material with a water solution containing the material to be recovered, such material so absorbed having a dimension less than that cationic distance between the silicate sheets while excluding that material having a dimension different from the dimension of the spaced silicate sheeting; removing excess water solution from the contacted activated sheet material; treating the contacted sheet material with an elution compound to elute from the absorbed activated sheet material the material to be receovered; recovering the eluted material; and repeating the steps through in a continuous manner.

In particular, my process concerns the employment of absorbed activated spongy vermiculite particles secured by an adhesive to an endless belt as the substrate, and wherein such vermiculite is activated by a dilute solution of an inorganic acid, such as hydrochloric acid. Further, my process concerns the technique of employing a single material to both activate the clay-mineral substance, as well as to elute recovered material from the activated clay-mineral substance, such as dilute hydrochloric acid. Furthermore, my process concerns the employment of separate activating and eluting materials and steps, such as, for example, the activation of a vermiculite material employing ammonium hydroxide, and the elution of recovered materials from the activated vermiculite particles by employing an organic material, such as ethanol. In addition, my process provides for the continuous removal of the excess activating liquid material by compressing the vermiculite material while on a substrate. My process and apparatus provides for the recovery of, for example, in ionic form, either single or multiple ions of selenium, uranium, thorium, yttrium, gold, silver, lithium, iodine, paladium, platinum, copper, vanadium and other ions. The recovery of material from the elution bath in my process may be accomplished by a variety of recovery techniques to include precipitating the recovery material employing an acid or a base or other means, distillation, adsorption, absorption and other conventional forms of recovering materials from water solutions.

My apparatus for the continuous recovery of materials from sea or brackish water comprises in combination: an endless belt or other such means of sheet material containing secured thereto a clay-mineral substance characterized by a sheet silicate structure, the silicate sheets separated by cations and having cation sites formed within the laminar-spacing area; an activating bath containing a liquid material to activate a substantial portion but not all of the cation sites in the clay-mineral substance on the endless belt with hydrogen or ammonium ions, an elution bath containing a liquid material to elute material absorbed from sea water by the activated clay-mineral material on the endless belt; means to convey the endless belt material from a source of sea water into the eluting bath and then into the activating bath in a continuous cyclic manner; means to remove excess sea water from the clay-mineral material on the endless belt prior to the belt being passed into the eluting or activating bath material; means to remove excess eluting or activating material prior to passage of the sheet material back into the sea water; and means to recover the desired material absorbed by the clay-mineral substance on the endless sheet from the elution bath.

As will be more particularly hereinafter described, my process provides for the recovery of both inorganic and organic materials. Typically, ethanol or a similar organic solvent; for example, methanol, methylethyl ketone, are employed for elution of the organic materials from the clay-mineral substance, while dilute; for example, 0.1N hydrochloric or other mineral acids are employed to elute inorganic materials from the clay-mineral substances.

The clay-mineral substances suitable for use in my invention are distinct from those generally crystal-like materials, such as porous volcanic rock or synthetic zeolite materials, and possess particular advantages for use in my apparatus and process. The clay-mineral substances employed in my invention are characterized in particular by vermiculite and contain composite silicate layers built from components with tetrahedrally or octahedrally coordinated cations. My clay minerals are typically hydrous silicates composed principally of aluminum or magnesium, which on heating, lose absorbed or constitutional water. Typically materials have a characteristic basal spacing between laminate layers of; for example, approximately 7 angstroms, 10 angstroms, 15 angstroms and 14.5 angstroms. For my purposes, those materials in which layer separation is variable, such as in vermiculite, due to swelling by water or organic liquids are the preferred materials. More particularly, my invention comprises the employment of vermiculite in its exfoliated form. The nature of the activation of the vermiculite; that is, the nature of the exchange cation, will influence the degree of hydration, and, consequently, the basal spacing between the silicate layer; for example, for magnesium vermiculite, which is a particularly preferred material, a spacing layer of about 14 angstroms result when the interlayer of water is replaced with glycol, while for potassium, ammonium, rubidium, and cesium vermiculites, the air spacing is such that glycol molecules are not permitted to penetrate. The particular characteristics of vermiculite and, its uses are set forth in *Rock Forming Minerals*, Volume 3, Sheet Silicates, by W.A. Deer, R.A. Howie and J. Zussman, published by Longmans, Green and Co. Ltd, 1967, pages 246–257, hereby incorporated by reference.

In particular, it should be noted that the vermiculite material employed in my invention, although a clay mineral characterized by a sheet spacing and although similar to talc, it is not the same and exhibits particular properties and characteristics which make it particularly valuable for use in my apparatus and process. Vermiculite has been discovered to be unusually well suited for my process and apparatus, since it is very inexpensive and easily available. It is stable, except in the presence of strong acid wherein it might be dehydrated, and it is flexible; that is, it may be employed in a substrate and the substrate passed over a continuous roller; for example, it can be squeezed by rollers in the manner of an inorganic sponge in order to remove excess material or liquid absorbed therein as set forth more particularly in FIG. 2 to be described hereafter. Further, vermiculite is easily ground without the requirement of adding liquid, and is ready for coating for use right after grinding. Vermiculite has also the characteristic of bonding well to sheets by adhesives because of its porosity and dry nature and its low density. Further, its low density permits a reduction in weight when employed as a coating on a belt-like material.

As described in more detail in Deer et al, vermiculite is particularly preferred in my invention because of its sheet-type structure which acts as a trap for ions and molecules. This type of laminar-spacing structure is quite superior to and more beneficial than the cage-type structure as employed in natural and synthetic zeolites. The laminar-saced structure; for example, in its expanded form, can accommodate large ions and molecules by virtue of such more open spacing in the laminar form in contrast to synthetic zeolites; that is, molecular sieves which employ a cage-type form which are employed to absorb smaller type particles, such as water, in organic solvents. It should be noted that in the zeolite-type structure, the entry of molecules or ions into the central cage-type structure is inhibited due to the dimensions of the passageway, while in a sheet-like laminar spacing of the vermiculite structure, ions and molecules may more readily pass in and out of such laminar spacing.

Importantly, vermiculite, citing the foregoing characteristics distinguishing it from other silicate material, has an unusually high charge deficiency, thereby giving it a high capacity for the absorption of ions. My process may be applied to any body of water or any part of the sea; however, there are special bodies of water, such as the Red Sea, that contain extra-ordinary amounts over the normal concentration of heavy metals, and such areas and similar areas are especially suitable for proper recovery of metals by employing my apparatus and process.

Activating in my process refers to the process by which at least a portion of the cations separating the silicate layers in a vermiculite or vermiculite-type clay-mineral material; that is, the aluminum, iron, silicon, magnesium, calcium, sodium, potassium, rubidium, cesium, barium, lithium, or other ions as inter-layer cations, are replaced. Typically, for example, the aluminum and $Fe+3$ are activated by a substance which allows the ion to replace all or part of the cations which normally occupy the interlayer structure. For example, vermiculite may be activated by contacting with a dilute hydrochloric acid solution. It is believed that the nature of the vermiculite allows the hydrogen ion to go on cation vacant spaces in the interlayer, and all or in part to replace cations of the natural vermiculite. Thus, the activated material when it contacts with a material to be recovered being higher in the electromotive force series, the higher material is attracted and absorbed into the laminar spacing of the activated vermiculite. Where a dilute hydrochloric acid serves to activate higher vermiculite particles, hydrochloric acid may also be employed in elution, it being thought that the hydrogen ion serves as an activating agent and the chloride ion and/or a lower pH serves as an eluting agent. Accordingly, activating prior to the removal of some of the heavy cations in the interlayer structure with smaller cations in such activated material, permits the adsorption within the spacing of the cation or other material to be recovered. Activating by employing a concentrated inorganic acid is not recommended since high acid concentration may injure this interlay spacing of the vermiculite.

The theoretical nature of my process, although not wholly understood, is believed to involve a combination of absorption and ion exchange, which combination permits the activated vermiculite materials to recover large quantities of the desired ions from water, and to permit the easy elution of such recovered materials from the activated vermiculite.

Activation of the substrate may be accomplished by a combination of physical and chemical methods. Grinding of the particles provides more active edges. Heating removes trapped moisture and expands the mica-type layers. If desired, a cheap and stable chemical, for example, dilute ammonia or dilute hydrochloric, may be deposited on the substrate. The ammonia provides a source of nitrogen lone-pair electrons for complexing materials. Other suitable activating agents are seed crystals and metal ores which promote the deposition of inorganic substances.

The step of eluting in my process refers to employing an eluting agent which permits the recovery material absorbed into the interlayer spacing of the activated vermiculite of vermiculite material to be recovered therefrom by ion exchange techniques, and, therefore, refers to the process of extracting from the vermiculite the materials captivated by the activated vermiculite, which material is to be recovered. In some cases, an activating agent may serve as an elution agent as in the case of dilute mineral acids, such as hydrochloric acid, or in some cases, separate materials are used to both activate and to elute. For example, ammonium hydroxide may serve as an activating agent placing ammonium ions within the cation positions of the vermiculite (i.e., onto unoccupied cation sites and displacing other cations) and material recovered from the spacing by employing an eluting agent, such as ethanol. The employment of an ammonium activating agent and an ethanol eluting agent is particularly desirable when organic materials or in sea or brackish water, such as the by-products of organic metabolism in such water, like glycerol, should be recovered employing my process.

Thus, by a combination of continuing activation and eluting steps, vermiculite and vermiculite type materials may be usefully employed to recover molecules from natural water.

The sheet material of my process is typically and preferably formed of a pliable plastic or fiber glass which can be rolled up on a rod for convenient storage and processing and/or formed into an endless belt. The rod can be attached to a rope or chain anchored under water with the longitudinal axis of the rod arranged perpendicular to the flow of current or tide or used as an endless belt as described.

The two dimensional sheets with the clay-mineral substrate thereon provide a more open structure for trapping particles and removing compounds and ions from the water than a three dimensional cage structure, such as a zeolite bed.

DESCRIPTION OF THE EMBODIMENTS OF THE INVENTION

Figure 1:
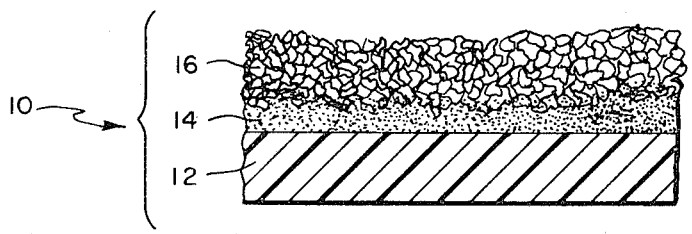
FIG. 1 shows an enlarged fragmentary illustrative cross-sectional view of a sheet material of my invention.

FIG. 1 shows in a cross-sectional fragmentary view a sheet material 10 of my invention and useful in my process and apparatus, which sheet material 10 comprises a nonabsorptive polymeric supporting sheet; for example, a polyester sheet like Mylar 12 having on one surface thereof an adhesive material 14, for example a rubber cement, such as a liquid nitrile or neoprene hardening-type solvent cement, and ground activated vermiculite particulate material 16 secured to the surface of the support sheet 12 by the curved adhesive material 14.

Figure 2:
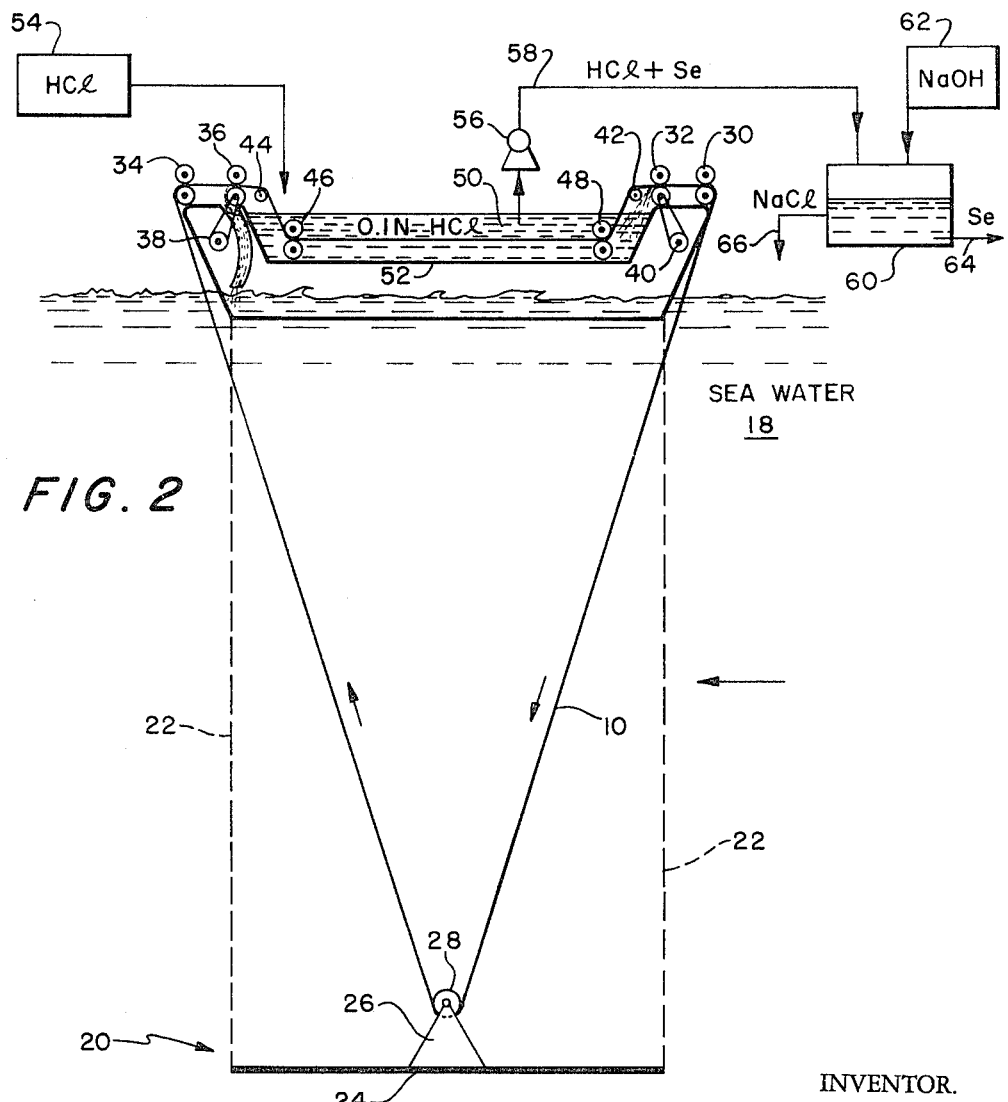
FIG. 2 is a schematic illustration of an apparatus and process for carrying out the continuous recovery of selenium ions from sea water.

FIG. 2 is a schematic illustration of an apparatus and process for the continuous recovery of selenium ions from sea water. The apparatus comprises an endless belt of sheet material 10 containing ground vermiculite material 16. The greater portion of the belt 10 is placed in sea water 18 and supported in the sea water through an anchoring device 20 beneath the sea comprising cables 22 supporting a platform 24, the platform containing a weight 26 attached to a free roller 28 about which the endless belt 10 passes. The other end of the belt 10 is supported on opposing rollers 30, 32, 34, 36, 46, and 48 and supporting rollers 44 and 42. Rollers 32 and 36 are driven through a motor-drive mechanism 38 and 40 to permit the endless belt sheet material 10 to be driven in the manner illustrated. Opposing rollers 36 and 32 are disposed in a manner to permit the removal of excess liquid material from the surface of the endless belt 10, and typically may comprise opposing rubber surface rollers having a clearance between the rollers of about the thickness of the sheet material 10 or slightly less. The roller arrangement permits the introduction of the endless belt 10 into a container 52 containing a dilute mineral aqueous acid solution 50, such as 0.1 normal hydrochloric acid. A source of additional hydrochloric acid 54 is provided to maintain a desired concentration of hydrochloric acid in solution in the container 52 which, in this case, serves both as an activating and elution container. Liquid from the bath 50 is removed through conduit 58 by pump 56 through a recovery container 60 wherein sodium hydroxide from a source 62 is introduced. The selenium salt is removed from the recovery container 60 through conduit 64 and the sodium chloride is removed through conduit 66 and returned to the sea water 18.

In operation, an endless belt of sheet material 10 containing ground vermiculite 16 secured to the polymer base 12 is driven by drive rollers 38 and 40 in a continuous manner as illustrated so as to have a residence time in the dilute hydrochloric acid 50 in the activating container 52 of approximately 10 minutes, and to provide a residence time in the sea water 18 of approximately 300 minutes or more. A typical rate employing a 20-foot activating tank 52 would be about 2 feet per minute of the endless belt, while the sheet material 10 may extend into the water at a depth of approximately 500 feet or more. The sheet material 10 is passed through compressing rollers 36 so that excess sea water 18 is removed from the surface of the sheet material 10 and permitted to return by gravity to the ocean. Excess sea water should be prevented from entering the activating hydrochloric acid solution 50 in order not to require inordinately replenishment of the hydrochloric acid solution by neutralization of the acid therein, since typical sea water has a pH of about 8.3 and would therefore form chloride salts if introduced into the activating solution 50.

On passage of the endless belt material through the sea water 18, due to activation by hydrogen ions of the cationic sites within the spacing of the silicate sheets in the ground vermiculite, ions, such as selenium ions, are absorbed within the lateral spacing of the activated ground vermiculite on the endless sheet material, while other materials in the sea water having a different dimension than the lateral silicate sheet spacing are prevented from being so absorbed. The sheet material 10, as it passes into one end of the container 52 and activating bath 50 through roller 44 and the pair of rollers 46, contains selenium ions from the sea water, which selenium ions are eluted from the vermiculite by action of the hydrochloric acid 50 which serves in this embodiment both as an activating agent and as an eluting agent. As the endless belt material 10 containing the selenium ions is passed through solution 50, the solution increases in selenium concentration, by elution, while the hydrochloric acid activates the cation sites within the lateral silicate spacing after elution of the selenium by the hydrogen ions of the acid bath 50. Thus, as the selenium is eluted, the ground vermiculite is again activated and the sheet passed through opposing rollers 48 over supporting roller 42 and through a pair of opposing compressing rollers 32 in order to remove excess hydrochloric acid from the surface of the sheet material 10 and to return said acid by gravity to the solution 50 as illustrated.

In the manner described, as the endless belt is moved from the eluting and activating bath 50 into the sea water 18, due to the vermiculite, a concentration of selenium or other ions is continually recovered and deposited in the bath 50. The desired acidity of the bath is maintained by the continuous introduction of hydrochloric acid from source 54 into the solution 50, while as the solution builds up in the desired ions, such as selenium, the liquid material is removed by pump 56 through conduit 58 into a recovery tank 60 where sodium hydroxide or another base is added from a source 62 to precipitate the desired salts and the salts, such as selenium, removed through a conduit 64, a selenium salts, while the resulting by-product of the reaction of sodium hydroxide and hydrochloric acid is discharged as sodium chloride through conduit 66 and returned to the sea water 18. If desired, ferric chloride may be added prior to the addition of the base from source 62, to flocculate the selenium. Final recovery from hydrochloric acid could be accomplished by raising the pH to 8.3 with sodium hydroxide, after which some metals will precipitate as the hydroxide. Further precipitation, if necessary, may be accomplished by adding a soluble sulfide or a chelating agent. The supernatent could then be disposed of at sea since it would be sodium chloride at the pH of ordinary sea water. Further, final recovery or organics from the solvent could be by evaporation with sun light.

EXAMPLE I

Commercially available expanded vermiculite was ground in a blender without the addition of liquid to produce flat particles no larger than 2 mm in diameter.

A thin layer of adhesive containing polyvinyl chloride and methyl isobutyl ketone was applied to a 20 by 10 cm. pliable plastic sheet. The ground vermiculite was sprinkled onto the wet adhesive until the surface was entirely covered, and the adhesive was allowed to dry.

The sheet was exposed to ocean water having a flow of approximately 100 feet/minute for 15 minutes.

The sheet was removed from the water and was rolled up. The sheet was first elutriated with denatured ethanol and then with dilute acetic acid. The elutriation was filtered through paper, and the filtrate was evaporated to dryness with heat.

The residues obtained from the ethanol extract were white solids. The residues obtained from the acetic acid extracts were brown solids. Both appeared to be complex mixtures which formed heterogeneous suspensions when water was added.

Flame tests were carried out to identify the recovered materials. A green flame indicated the presence of boron, and ammonium salts or compounds; and a blue flame indicated the presence of selenium. Char and odor indicated the presence of organic substances.

EXAMPLE II

The procedure set forth in Example I except that vermiculite substrate was soaked in a dilute ammonia solution for about 15 hours. Flame tests were carried out and a red flame indicated the presence of lithium and/or strontium.

It is quite likely that other materials were recovered which did not show up in the flame tests conducted in connection with Examples I and II.

EXAMPLE III

An endless sheet was prepared having a supporting sheet of Mylar with ground activated vermiculite treated with HCl secured to the sheet by liquid neoprene rubber. The sheet had a residence time in sea water pH 8.3 of 1 hour. The HCl treated vermiculite picked up 2.5 percent of radioactive selenium ($Se^{75}$) from the sea water during the residence time. The sheet was then passed through a bath as described for FIG. 1 for 10 minutes 0.1N HCl, and the selenium eluted. During the 10 minute residence time, 46 percent was eluted whereby the recovery of selenium was (2.5%) (0.46) = 1.1% recovery/1 hour of residence time.

My invention has been illustrated in particular in its preferred embodiment through the recovery of materials from sea water; however, it is recognized that my apparatus and process may be employed in the recovery of materials from brackish water or other aqueous or nonaqueous solutions containing recoverable material having the dimensions capable of being absorbed into the activated lateral sheet silicate space structure of mica and vermiculite. Further, my apparatus and process has been illustrated employing ground activated vermiculite secured to the surface of a plastic-supporting sheet; however, it is also recognized that any means of securing the vermiculite may be employed so that the vermiculite may be contained within a sheet, as well as coated on both sides of the plastic-supporting sheet, if desired. The apparatus and process as illustrated may be employed in a noncontinuous sheet, while the anchoring device as illustrated may be employed suspended from an oil or gas drilling tower.

In the preparation of my sheet material, as shown more particularly in FIG. 1, vermiculite is obtained as the commonly supplied "exfoliated" vermiculite material, which material is then ground is a blender, such as a Waring blender, while dry to a desired particle size, and the particles then sprinkled in a uniform manner onto a fresh liquid coating of an adhesive, such as a curable neoprene cement which has been coated in a thin layer on a plastic support. The adhesive is then cured and the sheet rolled and placed in the desired form.

Having described my invention what I now claim is:

1. A process for recovering materials, particularly, ionic substances, dissolved or suspended in sea water, which process comprises:
  a. providing a sheet material containing a clay-mineral substance, which substance has a sheet silicate structure, the sheet silicate separated by cations and defining a spaced laminar area and further having cation sites within such spaced laminar area;
  b. passing the sheet material into contact with a liquid bath containing a compound to activate a substantial portion, but not all, of the cation sites by replacing the cations of the sheet silicate with hydrogen or ammonium ions, thereby providing an activated clay-mineral substance on the sheet material;
  c. removing excess activating compound from said activated sheet material;
  d. contacting the activated sheet material with a water solution containing the material to be recovered;
  e. absorbing into the laminar spaces between the silicate sheets containing the activated cation sites the material to be recovered, such material so absorbed having a dimension smaller than the cationic distance between the silicate sheets, the clay-mineral substance excluding that material having a dimension greater than the dimension of the spaced laminar area of the sheet structure;
  f. removing excess water solution from the contacted activated sheet material;
  g. treating the contacted sheet material with an elution compound to elute from the absorbed activated sheet material the material to be recovered;
  h. recovering the eluted material; and
  i. repeating steps (b) through (h) in a continuous manner.

2. The process of claim 1 wherein the sheet material comprises an endless belt of a nonabsorptive polymeric sheet material capable of being transported by rollers and the clay-mineral substance secured to at least one surface thereof.

3. The process of claim 1 wherein the clay-mineral substance employed comprises mica or vermiculite.

4. The process of claim 1 wherein the sheet material comprises the clay-mineral material secured to the surface of a sheet material by an adhesive.

5. The process of claim 1 wherein the clay-mineral substance comprises a sheet silicate structure separated by magnesium, calcium, iron, or aluminum cations or combinations thereof.

6. The process of claim 1 wherein the sheet material is activated by passing the sheet material into an aqueous dilute mineral acid solution or a solution of ammonium hydroxide.

7. The process of claim 1 wherein the sheet material is activated by passing the sheet material into a dilute hydrochloric acid solution.

8. The process of claim 1 which includes removing excess liquid bath containing the activating compound from the sheet by passing the sheet through rollers to compress and remove liquid from the surface of the sheet.

9. The process of claim 1 which includes contacting the activated sheet material with water containing, as a material to be recovered in ionic form, selenium, uranium, thorium, yttrium, gold, silver, lithium, iodine, paladium, platinum, copper, and vanadium.

10. The process of claim 1 wherein the sheet material is contacted with sea or brackish water to recover from the water ionic materials.

11. The process of claim 1 which includes removing excess water from the contacted activated sheet material by passing the sheet material through compressing rollers.

12. The process of claim 1 wherein the absorbed material is eluted from the sheet material employing the same material as that used to activate the sheet material.

13. The process of claim 1 wherein the absorbed material in the sheet material is eluted employing a material different from that used to activate the sheet material.

14. The process of claim 1 wherein the absorbed material is eluted from the sheet material by employing an organic solvent.

15. The process of claim 1 wherein the absorbed material is recovered from the sheet material by precipitating the recovered material from a solution employing a base, the material recovered as a salt.

16. The process of recovering valuable materials dissolved or suspended in sea water, which process comprises:
  a. contacting sea water with an activated sheet silicate compound having a spaced laminar area separated by cations to absorb within the sheet silicate structure of the compound the material to be recovered;
  treating the sheet silicate compound to elute the absorbed material; and
  c. recovering the material from the elutate.

17. The process of claim 16 wherein the process includes:
  activating the treated sheet silicate compound from which the materials are eluted, and reusing such silicate compound in the process.

18. The process of claim 16 wherein the process includes:
removing excess sea water from the sheet silicate compound prior to the treating step.
19. The process of claim 16 wherein the material to be recovered includes selenium.
20. The process of claim 16 wherein the sheet silicate compound is activated vermiculite or mica.
21. A process for the recovery of selenium from sea water which comprises:
 a. providing a sheet material containing activated expanded mica;
 b. exposing the sheet material to the ocean water to absorb selenium ions within the activated mica;
 c. removing the sheet material from the sea water;
 d. elutriating the sheet material with ethanol to form a first elutriation;
 e. elutriating the sheet material with acetic acid to obtain a second elutriation;
 f. filtering the first and second elutriations to form first and second filtrates; and
 g. recovering the selenium by evaporting the second filtrate to dryness.

* * * * *